United States Patent [19]
Iizuka

[11] Patent Number: 4,606,612
[45] Date of Patent: Aug. 19, 1986

[54] OPTICAL PHASE FILTER USING LIQUID CRYSTAL

[75] Inventor: Kiyoshi Iizuka, Kanagawa, Japan

[73] Assignee: Canon Kabushiki Kaisha, Tokyo, Japan

[21] Appl. No.: 616,550

[22] Filed: Jun. 1, 1984

[30] Foreign Application Priority Data

Jun. 10, 1983 [JP] Japan .................................. 58-102695
Jun. 10, 1983 [JP] Japan .................................. 58-102696
Oct. 6, 1983 [JP] Japan .................................. 58-187396

[51] Int. Cl.$^4$ .................................................. G02F 1/13
[52] U.S. Cl. .................................. 350/336; 350/331 R; 350/347 R; 350/347 V
[58] Field of Search ............... 350/331 R, 336, 347 V, 350/347 R, 347 E

[56] References Cited

U.S. PATENT DOCUMENTS

| | | |
|---|---|---|
| 4,023,890 | 5/1977 | Shirasu et al. ..................... 350/336 |
| 4,137,524 | 1/1979 | Chen et al. ..................... 350/336 X |
| 4,200,361 | 4/1980 | Malvano et al. ..................... 350/336 |
| 4,277,786 | 7/1981 | Waldron ..................... 350/336 X |

Primary Examiner—John K. Corbin
Assistant Examiner—Richard F. Gallivan
Attorney, Agent, or Firm—Toren, McGeady, Stanger, Goldberg & Kiel

[57] ABSTRACT

An optical phase filter includes a liquid crystal layer whose configuration changes between the homogeneous and homeotropic configurations depending upon whether or not an electric field is applied thereacross. A pair of transparent electrodes apply the electric field to the liquid crystal layer. At least one of the transparent electrodes is provided with a great number of holes distributed at random over its entire surface, whereby the optical performance and particularly the MTF value of the light passing through the liquid crystal layer due to the double-refracting property of the liquid crystal layer is made variable.

6 Claims, 13 Drawing Figures

OPTICAL PHASE FILTER USING LIQUID CRYSTAL

BACKGROUND OF THE INVENTION

1. Field of the Invention

This invention relates to optical phase filters, and more particularly to optical phase filters using liquid crystals capable of varying the imaging performance of cameras and other optical instruments.

2. Description of the Prior Art

An optical phase filter 1 as shown in FIG. 1 has been employed for lowering the sharpness of the image formed by lens or the like. In FIG. 1, a glass substrate 2 is provided with a great number of transparent round convex phase portions 3 of silicon oxide or the like. This optical phase filter is generally called a "soft focus filter" and when used as an attachment to the front of the objective lens of a camera, can lower the image sharpness so that soft portrayal photographs, which are said to be psychologically pleasant, are obtained.

Analyses have already been made of how the optical phase filter affects the image sharpness, or MTF, at the pupil of an imaging optical system. Assuming that the phase portions 3 of FIG. 1 have a value $\delta$ and their distribution is at random, the curve shown in FIG. 2 is obtained for MTF versus Space Frequency. Specifically, a portion A-B, in which the mutual relation of randomness (MTF) decreases, joins with another portion B-C, in which the randomness has a constant mutual relation. However, the mutual relation of the aperture of the pupil only works at a turning point B. This turning point B can be defined in the coordinates of FIG. 2 by $$Fb \approx a/(f \cdot \lambda) \quad (1)$$

$$Mb = |Ao + A\delta \cdot \exp[-ik\delta]|^2 \quad Ao + A = 1 \quad (2)$$

$$k \cdot \delta = 2\pi/\lambda \cdot (n-1)d \quad (3)$$

where a is the average of the diameters of the phase portions 3; f is the focal length of the image forming lens; and $\lambda$ is the wavelength of light. Also $A\delta$ is the ratio of the total sum of the areas of the phase portions 3 to the entire area of the filter; and Ao is the ratio of the phaseless area (zero phase) to the entire area. The phase $\delta$ represents the difference between the lengths of the optical path through the phase portion 3 and the phaseless portion. In these equations n is the refractive index of the phase portion, and d is the geometric thickness of the phase portion. The point B can be fully determined using equations 1 to 3 and a certain combination of values of the parameters $\lambda$, Ao, $A\delta$, a, f, and $\lambda$.

When $Ao = A\delta = 0.5$, $$Mb = \cos^2(k\delta/2) \quad (4)$$

For $\delta = 5\lambda g = 0.5 \times 550$ [nm], the MTF value Mb at the point B varies with wavelength as shown in FIG. 3. Where $\delta = 0.5\lambda g$, the phase filter 1 can lower the MTF throughout the entire visible light region.

However, the camera lens does not always obtain a soft portrayal. Occasionally, sharp representations result. Therefore, conventional practice has been to attach or detach the optical phase filter 1 to or from the lens as needed. Also, the optical phase filter has been replaced by another one to change the degree of softness of the portrayal. In some photographic situations, a photographer may desire to change rapidly between soft and sharp portrayal shootings, or to change rapidly between the different degrees of softness in successive shootings. In such cases, the use of conventional optical phase filters did not meet that need, because quick and easy attaching or interchanging of the filters was very difficult to perform.

It has been proposed to use liquid crystals for constructing an optical phase filter so that quick and easy change between the soft and sharp representations is possible. For example, in Japanese Laid-Open Patent Application No. SHO-50-84236 (published July 9, 1975), transparent electrodes on either side of the liquid crystal layer are provided with regular array of holes to make the liquid crystal carry out the above-described function. However, this prior known filter has the drawback that the soft focus effect is produced only in a particular direction.

An object of the present invention is to eliminate the above-described problems, and to provide an optical phase filter using a liquid crystal which, when once attached, is able to change over between a soft portrayal over the entire area of the image and a sharp portrayal without having to be detached.

To accomplish this object, according to the present invention, the filter is constructed with a liquid crystal layer of which the structure changes between the homogeneous configuration and the homeotropic configuration depending upon the presence or absence of application of an electric field. Two transparent electrodes apply the electric field to the liquid crystal layer. At least one of the two transparent electrodes is provided with a great number of holes distributed at random over the entire area thereof so that the MTF value is made to vary by the double-refracting property of the liquid crystal.

DETAILED DESCRIPTION OF THE PREFERRED EMBODIMENTS

Figure 4:
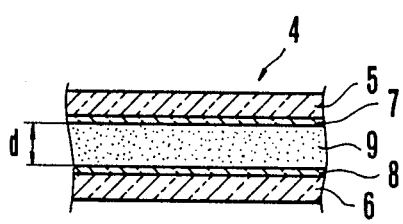
FIG. 4 is a sectional view of an embodiment of a phase optical filter according to the present invention.
Figure 5:
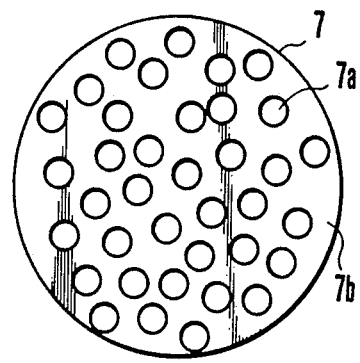
FIG. 5 is a plan view of the transparent electrode in the FIG. 4 embodiment.
Figure 6A:
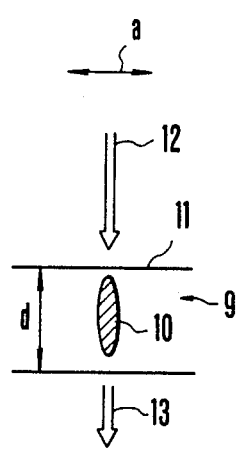
FIGS. 6(a) and 6(b) are schematic diagrams illustrating a change of the arrangement of liquid crystal.
Figure 6B:
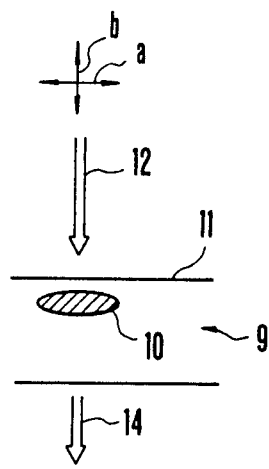

In FIG. 4, 4 is an optical phase filter using liquid crystals, 5 and 6 are glass substrates. On the surfaces of said glass substrates 5 and 6 are formed transparent electrodes 7 and 8. The electrode 7 has, as illustrated in FIG. 5, a great number of holes 7a distributed at random, while electrode 8 is uniform over the entire area. All the holes 7a are formed to a round shape of the same size from hole to hole. 7b is a holeless portion. 9 is a liquid crystal layer of negative nematic structure. In FIGS. 6(a) and 6(b), 10 is a liquid crystal molecule, 11 is a boundary surface between the transparent electrode 7 and the liquid crystal layer 9, 12 is a light incident on the liquid crystal layer 9, 13 and 14 are emerging lights from the liquid crystal layer 9, arrows "a" and "b" indicate the directions of polarization of the incident light, the arrow "b" actually being perpendicular to the paper, and "d" is the thickness of the liquid crystal layer 9.

In operation, when no electrical potential is applied between the transparent electrodes 7 and 8, the liquid crystal molecules in the layer 9 change their orientation to be normal (homeotropic configuration) to the boundary surface 11 over the entire surface area. If, at this time, the incident light is polarized in the direction "a", no double refraction takes place, so that ordinary rays emerge as the ray 13 passed through the medium of refractive index $n_o$.

When a voltage is applied between the transparent electrodes 7 and 8, the holeless portion 7b of the transparent electrode 7 and the transparent electrode 8 makes only those liquid crystal molecules 10 which lie therebetween become parallel (homogeneous configuration) to the boundary surface 11, as shown in FIG. 6(b). Accordingly a double-refraction takes place, and extraordinary rays of light result, emerging as the ray 14 passed through the medium of refractive index $n_e$. The general incident light 12 contains two directions of polarization "a" and "b" as illustrated in FIG. 6(b). For one incident light, therefore, an ordinary ray and an extraordinary ray are formed. But the double refraction does not take place in the direction of "b" of polarization. In the portions of the liquid layer 9 which lie between the holes 7a and the transparent electrode 8, little electric field is produced so that the liquid crystal molecules 10 remain normal (homeotropic configuration). Therefore, no double refraction takes place. As a result, all the rays of light passed through the liquid crystal layer 9 are ordinary and extraordinary rays in mixture. The length of optical path of the ray 13 in the liquid crystal layer 9 is equal to $n_o d$, and that of the optical path of ray 14 to $n_e d$. That is, the rays 13 and 14 are differentiated in phase by a magnitude expressed as:

$$\delta = 5 1 n_e - n_o | \cdot d$$

With such an optical phase filter arranged in the pupil position of the image forming lens MTF takes a value determined by the above-formulated equations (1) and (2). In equation (3), when the optical phase filter of the invention is in use, the following formula is obtained.

$$k \neq \delta = 2\pi/\lambda \cdot |n_e - n_o| \cdot d \quad (5)$$

Figure 3:
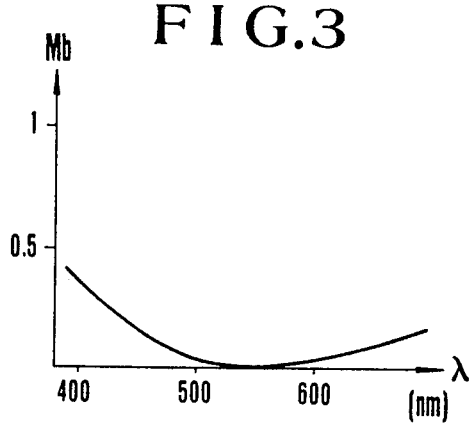
FIG. 3 is a graph for explaining the wavelength characteristic of the image forming optical system due to the optical phase filter.

In general, the difference in the refractive index of the liquid crystal material, $\Delta n = n_e - n_o$, is on the order of 0.02 to 0.2, and the thickness of the liquid crystal layer is about 10 microns. Here, when a liquid crystal material is employed having, for example, a refractive index difference of $\Delta n = 0.08$, available under the tradename of En-34 from Chisso Kabushiki Kaisha, we obtain a value of the phase difference $\delta = 0.5\lambda g = 0.5 \times 550$ [nm] from equation (5), for the liquid crystal layer 9 of thickness $d = 3.4\mu$. Thus it is made possible to provide a filter having equivalent characteristics to those of the filter of FIG. 3. By using the optical phase filter 4 of such construction, the MTF can be lowered over the entire visible light region. In other words, to obtain a photograph of soft focus effect, all one has to do is to apply the voltage between the transparent electrodes 7 and 8 of the optical phase filter 4. To obtain photographs of sharp focus, no voltage is applied.

Figure 2:
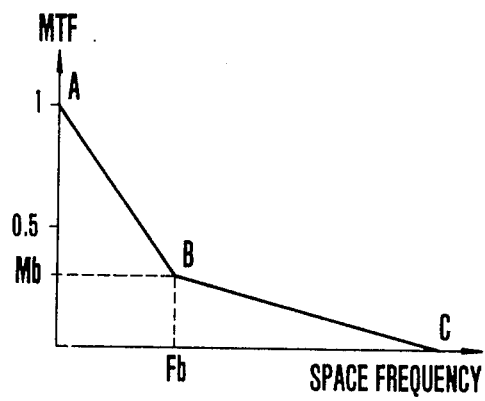
FIG. 2 is a graph for explaining the behavior of the MTF of an image forming optical system due to the optical phase filter.

The value of the space frequency Fb for the position of the turning point B of FIG. 2 is, as will be understood from equation (1), determined by the size of the hole 7a that gives the phase difference $\delta$. Though, in this embodiment, the shape of the hole 7a has been described as round, it may be otherwise formed to an elliptical, or rectangular shape. Another modification is that the holes 7a are distributed so that the MTF has different values with different directions. Also, though the foregoing explanation has been given for the case where the optical phase filter 4 is positioned at the pupil of the image forming optical system, it may be otherwise positioned near the pupil, or in front of, or in rear of the lens to effect an equivalent result. Further, though the transparent electrode 8 has been described as a uniform electrode, this may be varied so that both of the transparent electrodes 7 and 8 are provided with holes in a patterned way.

Figure 7:
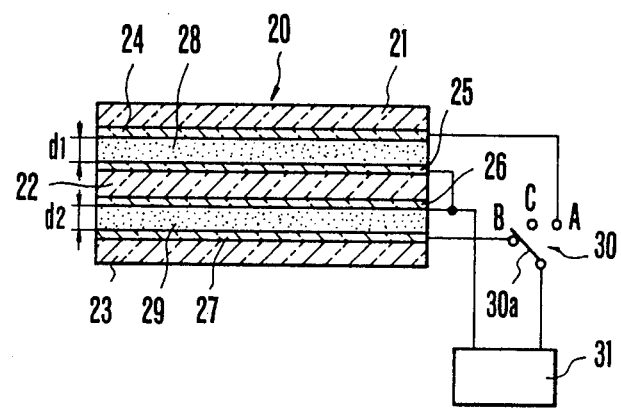
FIG. 7 illustrates another embodiment of the invention.
Figure 8A:
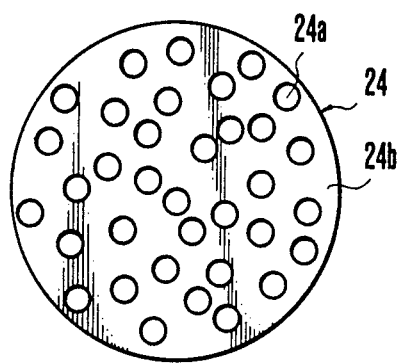
FIGS. 8(a) and 8(b) are plan views of the transparent electrodes of the embodiment of FIG. 7.
Figure 8B:
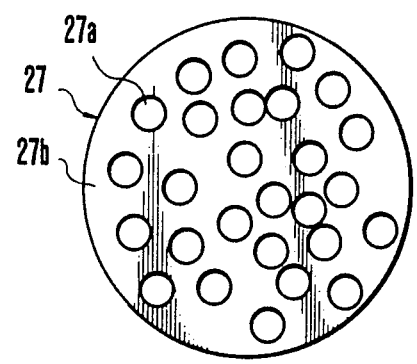

FIGS. 7, 8(a) and 8(b) illustrate another embodiment of the invention. In these drawings, 20 is an optical phase filter, 21, 22 and 23 are glass substrates. Two liquid crystal layers 28 and 29 are held to form a laminated type of cell by the glass substrates 21, 22 and 23 and transparent electrodes 24, 25, 26 and 27 formed thereon respectively. The transparent electrodes 24 and 27 are each provided with a great number of holes 24a, 27a distributed at random. All the holes 24a in the electrode 24 are formed to a round shape of the same size from hole to hole, while all the holes 27a in the electrode 27 are formed to a round shape of the same size from hole to hole. The diameters of the holes 24a and 27a are different from each other. The transparent electrodes 25 and 26 are uniform over the entire surface area. Elements 24b and 27b are non-opening portions. The liquid crystal layers 28 and 29 are formed by a nematic liquid crystal material whose dielectric anisotropy is negative. When no electric field is applied, the orienting state is rendered homeotropic by an orienting film (not shown). Element 30 is a change-over switch with a movable contact 30a being selectively thrown to three contacts A, B and C. The contact A is connected to the transparent electrode 24, and the contact B to the electrode 27. The contact C is open. A drive circuit 31 has one terminal connected to the change-over switch 30 and another terminal connected to the transparent electrodes 25 and 26.

Figure 1:
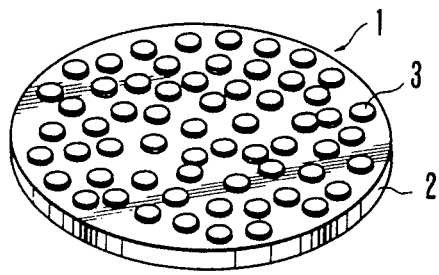
FIG. 1 is a perspective view of an example of the conventional optical phase filter.

In operation when the contact C is selected by the switch 30, the liquid crystal layers 28 and 29 both are out of an electric field, so that as illustrated in FIG. 6(a), the liquid crystal molecules 10 in each layer are homeotropically arrayed. Therefore, the liquid crystal layers 28 and 29 do not double-refract light in passing therethrough, and, as they are equivalent to a medium of a thickness equal to the sum of the thickness d1 and d2 with a refractive index $n_o$, the wave surface does not change. When the change-over switch 30 is moved to position A, a voltage is applied between the transparent electrodes 24 and 25 to drive only the first liquid crystal layer 28. At this time, those portions of the liquid crystal layer 28 which lie between the non-opening portion 24b of the transparent electrode 24 and transparent electrode 25 are rendered homogeneous, and operate as a medium of refractive index $n_e$ and thickness d1. As a result, the opening portion 24a has an optical path length $n_o$d1 and the non-opening portion 24b has a different optical path length $n_e$d1. Thus the filter of FIG. 7 produces an equivalent effect of the prior known filter 1 of FIG. 1. When the change-over switch 30 is in position, similarly to the case of selection of the position A, the voltage is applied between the transparent electrodes 25 and 27 to drive only the second liquid crystal layer 29, so that the opening portion 27a has an optical path length $n_o$d2 and the non-opening portion 27b has another optical path length $n_e$d2.

For such laminated type optical phase filter 20 including the liquid crystal layers 28 and 29, when arranged at the pupil plane of the image forming optical system, the values of MTF can be found by the above-defined equations (1) and (2). Equation (3) for the phase difference $\delta$ has, in this embodiment, to be rewritten as follows:

$$k \cdot \delta 1 = (2\pi/\lambda) \cdot |n_e - n_o| \cdot d1 \tag{6}$$

$$k \cdot \delta 2 = (2\pi/\lambda) \cdot |n_e - n_o| \cdot d2 \tag{7}$$

Letting a1 and a2 denote the diameters of the holes 24a and 27a of the transparent electrodes 24 and 27 respectively, when a1 < a2, the turning point B of FIG. 2 selectively takes values Fb1 and Fb2 where Fb2 > Fb1. By selectively operating the liquid crystal layers 28 and 29, therefore, it is made possible to change over between two different degrees of softness of portrayal.

In this embodiment, one of the liquid crystal layers 28 and 29 is made selectable at a time to obtain different values of MTF from each other. But the liquid crystal layers 28 and 29 may be otherwise driven simultaneously to obtain an additional different value of MTF. Although, in this embodiment, two liquid crystal layers 28 and 29 are used in constructing an optical phase filter, three or more liquid crystal layers may be laminated to form an optical phase filter 20 having three or more values of MTF.

Figure 9:
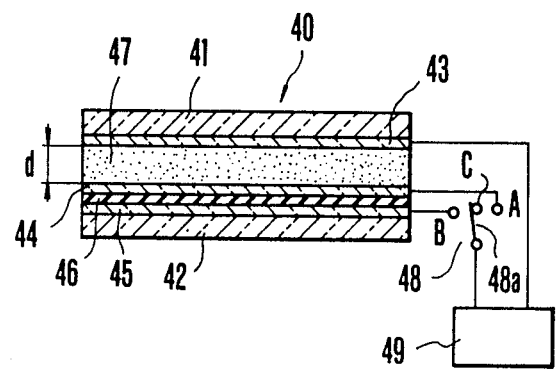
FIG. 9 illustrates still another embodiment of the invention.
Figure 10A:
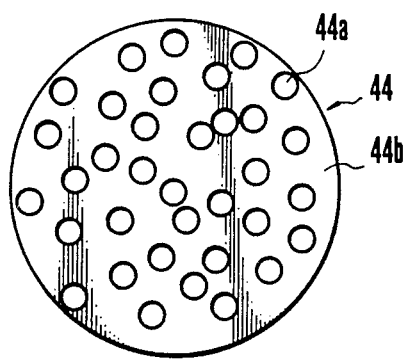
FIGS. 10(a) and 10(b) are plan views of the transparent electrodes of the embodiment of FIG. 9.
Figure 10B:
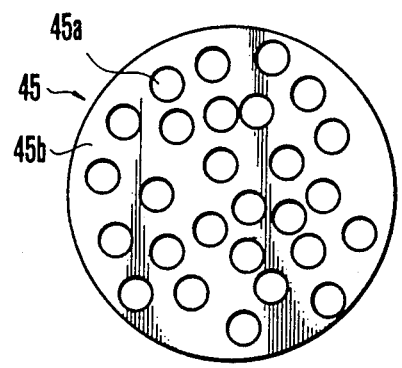

FIG. 9, and FIGS. 10(a) and 10(b) illustrate still another embodiment of the invention. In these drawings, 40 is a optical phase filter constructed with a cell holding a liquid crystal layer 17 by glass substrates 41 and 42, transparent electrodes 43, 44 and 45 formed thereon and an insulating layer 46 of $SiO_2$ or the like. The insulating layer 46 lies between the electrodes 44 and 45, and the electrode 44 is nearer to the liquid crystal layer 47 than the electrode 45. The liquid crystal layer 47 is made of a nematic liquid crystal material whose dielectric anisotropy is positive, and its orienting state at the time of application of no voltage is made homogeneous by an orientation film (not shown). The transparent electrode 43 is uniform in thickness over the entire surface area and is connected to a common terminal of a drive circuit 49.

On the other hand, the transparent electrodes 44 and 45 have many holes 44a and 45a distributed at random as shown in FIGS. 10(a) and 10(b) respectively. In the electrode 44, all the holes 44a are formed to a round shape of the same size from hole to hole, while in the electrode 45, all the holes 45a are formed to a round shape of the same size from hole to hole. The diameter of the hole 44a is made smaller than the diameter of the hole 45a. A change-over switch 48 has a movable contact 48a selectively cooperative with terminal A connected to the electrode 44, terminal B connected to the electrode 45, and terminal C of open state. The common terminal of this switch 48 is supplied with a signal voltage from the drive circuit 49.

When the switch contact 48a is set in terminal C, the liquid crystal layer 47 has no electric field applied to it, and therefore, is of the homogeneous array. Thus liquid crystal layer 47 does not cause double-refraction, the rays of light passing through the liquid crystal layer 47 have the same orientation as they pass through a medium that has a thickness "d" and a refractive index $n_e$ and the wave surface does not change.

When the switch contact 48a is in position B, the transparent electrodes 45 and 43 apply an electric field through the insulating layer 46 to the liquid crystal layer 47. At this time, those portions of the liquid crystal layer 47 which lie between the non-opening portion 45b and the transparent electrode 43 become homeotropic, and are equivalent to a medium of a refractive index $n_o$ and a thickness "d". As a result, the opening portion 45a has $n_e$d and the non-opening portion 45b has $n_o$d. That is, they have different optical path lengths from each other and produce an equivalent effect to that of the filter of FIG. 1. On the other hand, when the switch contact 48a is in position A, the length of the optical path is $n_e$d in the opening portion 44a and $n_o$d in the non-opening portion 44b.

In this embodiment also, because the size of the opening portion 44a of the electrode 44 is different from that of the opening portion 45a of the electrode 45, similarly to the FIG. 7 embodiment, different soft focus effects can be obtained.

What I claim is:

1. An optical phase filter comprising:
   a liquid crystal layer; and
   a transparent electrode for applying an electric field to said liquid crystal layer, said transparent electrode having a plurality of openings distributed at random.

2. A filter according to claim 1, wherein said liquid crystal layer changes its structure between a homogeneous array and a homeotropic array depending upon whether or not the electric field is applied thereto.

3. An optical phase filter comprising:
   a liquid crystal layer
   first and second transparent electrodes for applying an electric field to said liquid crystal layer, said first and second transparent electrodes having a plurality of openings distributed at random, the openings of said first transparent electrode being different in size from the openings of said second transparent electrode; and
   means for selectively actuating one of said first and said second transparent electrodes.

4. A filter according to claim 3, wherein said first and said second transparent electrodes are arranged on different sides of said liquid crystal layer.

5. A filter according to claim 3, wherein said first and said second transparent electrodes are arranged on the same side of said liquid crystal layer in an electrically insulated manner.

6. A filter according to claim 4 or 5, wherein said liquid crystal layer changes its structure between a homogeneous array and a homeotropic array depending upon whether or not the electric field is applied thereto.

* * * * *